(12) United States Patent
Heberer

(10) Patent No.: US 8,094,036 B2
(45) Date of Patent: Jan. 10, 2012

(54) MONITORING DEVICE FOR A LASER MACHINING DEVICE

(75) Inventor: Erwin Martin Heberer, Heusenstamm (DE)

(73) Assignee: FFT EDAG Produktionssysteme GmbH & Co. KG, Fulda (DE)

(*) Notice: Subject to any disclaimer, the term of this patent is extended or adjusted under 35 U.S.C. 154(b) by 396 days.

(21) Appl. No.: 12/377,135

(22) PCT Filed: Aug. 16, 2007

(86) PCT No.: PCT/EP2007/007231
§ 371 (c)(1),
(2), (4) Date: Feb. 11, 2009

(87) PCT Pub. No.: WO2008/019847
PCT Pub. Date: Feb. 21, 2008

(65) Prior Publication Data
US 2010/0164739 A1 Jul. 1, 2010

(30) Foreign Application Priority Data
Aug. 18, 2006 (DE) .................. 10 2006 038 795

(51) Int. Cl.
*G08B 21/00* (2006.01)
(52) U.S. Cl. ............... 340/680; 219/121.6; 219/121.62; 219/121.81; 219/121.83
(58) Field of Classification Search .............. 340/679, 340/680, 686.5; 219/121.6, 121.62, 121.83, 219/121.81, 121.78, 121.61; 348/86; 700/67, 700/166; 356/152.1, 227
See application file for complete search history.

(56) References Cited

U.S. PATENT DOCUMENTS

| 4,504,727 | A  | * | 3/1985  | Melcher et al. .......... 219/121.62 |
| 4,584,455 | A  | * | 4/1986  | Tomizawa ................ 219/121.68 |
| 4,730,113 | A  |   | 3/1988  | Edwards et al. |
| 5,045,669 | A  |   | 9/1991  | Ortiz, Jr. et al. |
| 5,059,760 | A  |   | 10/1991 | Iehisa et al. |
| 6,691,763 | B1 | * | 2/2004  | Bond ............................ 164/4.1 |
| 2001/0023862 | A1 | * | 9/2001 | Hartmann et al. ....... 219/121.83 |
| 2002/0158053 | A1 |   | 10/2002 | Kessler et al. |
| 2003/0234240 | A1 | * | 12/2003 | Yamazaki et al. ...... 219/121.62 |
| 2004/0026389 | A1 | * | 2/2004 | Kessler et al. ........... 219/121.83 |
| 2005/0252895 | A1 | * | 11/2005 | Schuermann et al. ... 219/121.83 |

FOREIGN PATENT DOCUMENTS

| DE | 3705182  | 9/1988 |
| DE | 3913786  | 10/1990 |
| DE | 9403822  | 3/1994 |
| DE | 19839482 | 3/2000 |
| DE | 10013892 | 12/2000 |

(Continued)

*Primary Examiner* — Brent Swarthout
(74) *Attorney, Agent, or Firm* — Connolly Bove Lodge & Hutz LLP

(57) ABSTRACT

A monitoring device (10) for a laser machining device (12) that has one or more laser beams (13) that are displaced along a predetermined adjustable trajectory (14, 16) along a workpiece (18) includes one or more sensors (20, 22) which monitor(s) the processing signal (24) of the machining process in a three-dimensional section (26). The one or more sensors (20, 22) activate an alarm device or interrupter (28) for the one or more laser beams (13) of the laser machining device (12) if the one or more process signals (24) in the section (26) exceed a predetermined threshold value or fall short of it, the one or more sensors (20, 22) being independent of the laser machining device (12).

18 Claims, 1 Drawing Sheet

FOREIGN PATENT DOCUMENTS

| | | |
|---|---|---|
| DE | 10120251 | 11/2002 |
| DE | 102004041682 | 3/2006 |
| EP | 0407598 | 1/1991 |
| JP | 2000024785 | 1/2000 |

\* cited by examiner

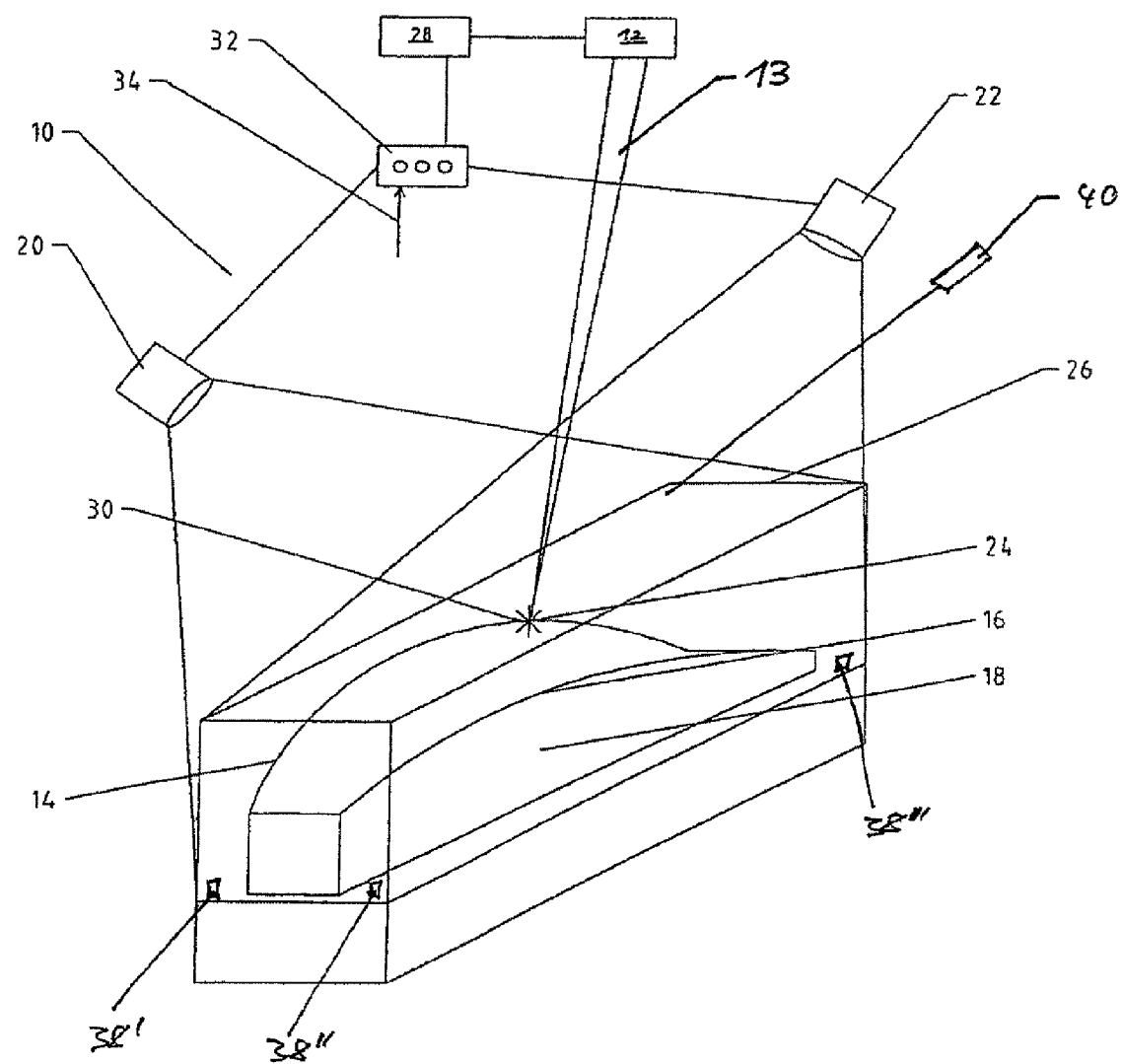

MONITORING DEVICE FOR A LASER MACHINING DEVICE

CROSS-REFERENCE TO RELATED APPLICATIONS

This application is a national stage application (under 35 U.S.C. §371) of PCT/EP2007/007231, filed Aug. 16, 2007, which claims benefit of German application 10 2006 038 795.3, filed Aug. 18, 2006.

DESCRIPTION

The invention relates to a monitoring device for a laser machining device comprising one or more laser beams that travel in a prescribed, adjustable trajectory along a workpiece for purposes of machining it by means of welding, cutting, drilling or the like, and whereby this machining operation is repeated from one workpiece to the next during the serial production of the workpieces.

STATE OF THE ART

German utility model DE 94 03 822 U1 discloses a monitoring device for laser beams in which an optically transparent component of the machining optical system is connected to a measuring device for purposes of detecting scattered radiation. The control unit is configured in such a way that the laser radiation is switched off when it exceeds or falls below a reference value by a prescribed magnitude. In this context, the optical component that is monitored is the one located closest to the workpiece, for instance, a pane of protective glass that is meant to protect the focusing lens against dirt. The magnitude of the scattered radiation of this component is fundamentally constant as long as the laser power remains unchanged. Therefore, a positive or negative deviation of the measured scattered radiation means that an interference is present in the transmission of radiation from the laser source to the workpiece, so that it can be advisable to switch off the laser. This monitoring device, however, is not adapted to the serial production of numerous workpieces for which the laser beam or beams travel along prescribed, constant or adjustable trajectories.

German patent application DE 10 2004 041 682 A1 discloses a $CO_2$ laser machining head with an integrated monitoring device. The head has a lens through which the laser beam is directed at a workpiece. A monitoring device is provided for purposes of monitoring the machining optical system for defects and contamination, and it encompasses a plurality of light diodes and photodiodes that are oriented toward an optically effective surface of the machining optical system and distributed around the $CO_2$ laser radiation so that, by detecting reflection and scattered fractions of the light diode radiation, conclusions can be drawn about defects and contamination of the optically active surface of the machining optical system.

Another rather complex laser beam machining device having a monitoring device is disclosed in European patent application EP 0 407 598 B1. This device is also based on the reflection of a laser beam from the workpiece surface, whereby a maximum initial value can be calculated by means of a complex calculation formula.

German patent application DE 101 20 251 A1 discloses a method and a sensor device for monitoring a laser machining process that is to be carried out on a workpiece. Here, optical means are used in conjunction with a sensor device attached to the laser machining head to evaluate an observation field that does not have to coincide with the interaction zone between the laser beam and the workpiece.

German patent application DE 39 13 786 A1 discloses a device for contact-free sound-emission measurement for process control or quality assurance purposes.

Japanese patent application JP 2000/024785 A discloses a device for detecting breaks in optical conductors for laser beam machining devices. By means of the device, the UV radiation in the machining space is detected, and on this basis, conclusions are drawn about the condition of the optical fiber cables.

SUMMARY OF THE INVENTION

Task at Hand

In contrast to the prior art, the present invention has the objective of refining a monitoring device for a laser machining device of the above-mentioned type in such a way that, during the serial production of workpieces in which the laser beam travels repeatedly along a prescribed, adjustable trajectory, simple detection of an error can be achieved.

According to a secondary aspect, it is an additional objective that, in laser processes that use high-power lasers in conjunction with an optical system having a large focal length, the laser protection walls are not subjected to excessively high loads in case of an error, and the laser beam is switched off by means of the monitoring device, also in order to protect the laser protection walls. This is intended to take into consideration the fact that the laser protection walls used so far are exposed to a considerably higher power density in the new high-power lasers, so that utilizing the physical property of "heat conduction" cannot be done to the extent that was done earlier.

THE INVENTION AND ITS ADVANTAGEOUS EFFECTS

This objective is essentially achieved according to the invention in a monitoring device having the above-mentioned features in that one or more sensors are provided that monitor the process signal of the machining operation in a three-dimensional spatial section, whereby the sensor or sensors activate a warning device or switch-off device for the laser beam if the process signal in the spatial section exceeds or falls below a prescribed threshold value, whereby the sensor or sensors are independent of the laser machining device.

Since, as a rule, the trajectories that the laser beam or beams follow depending on the shape of the workpiece to be machined are preprogrammed, the machining operation in serial production is constantly repeated from one workpiece to the next. This makes it possible to spatially limit the range of action of the laser beam or the course of the trajectory of the laser beam from the starting position to the end position, so that a spatial section or a segment area can be defined in which the process signal comes to lie below or above a given threshold value in the normal case. If deviations from this are ascertained, the laser beam is switched off by means of a switch-off device. As an alternative or else in addition to this, a warning device can be activated.

Since the sensors are independent of the laser machining device, the laser machining device and the sensors that monitor the laser machining device are uncoupled from each other. Consequently, the sensors are capable of detecting when the laser beam or beams of the laser machining device leave the spatial section of the machining and go into the space.

According to a first advantageous embodiment of the invention, it is provided that the sensor or sensors can be positioned so as to be stationary relative to the workpiece. In this context, the sensors are advantageously configured in such a way that they detect the entire machining area. This facilitates the adjustment. A stationary orientation of the sensors relative to the workpiece especially facilities the monitoring of the laser beam or beams of the laser machining device since boundaries that may not be passed by the laser beam can be defined in the monitoring software. The switch-off device and/or warning device is automatically activated if these boundaries are passed.

According to an alternative embodiment, the sensor or sensors are configured so as to be moveable relative to the workpiece. On the one hand, this makes it possible to monitor spatial sections that are larger than the spatial section that can be detected with the sensor or sensors. As a result, fewer sensors have to be employed. On the other hand, this makes it possible to exactly adjust the sensor or sensors and to select such an observation point that allows the machining area to be detected at any time without, for example, the laser machining device having to move between the sensor and the machining area. Therefore, this makes it possible to always detect the monitoring area in its entirety, even in the case of different workpieces or different machining programs as well as in the case of resulting movements of the laser machining device. Here, it can be advantageously provided that the sensor or sensors are positioned so as to be stationary relative to the workpiece during the machining process, as a result of which the signal picked up by the sensor or sensors can be easily and unambiguously associated with a position of the machining area of the laser beam of the laser machining device.

It is particularly advantageous if the sensor or sensors are configured so as to be spatially resolving. This allows an especially easy evaluation by associating the position of the process signal with the current machining area, in contrast to which, when sensors that are not spatially resolving are employed, it is necessary to use a plurality of sensors and a special evaluation algorithm that reconstructs the position of the process signal on the basis of various signal levels. Moreover, spatially resolving sensors are less susceptible to interference since other error sources can falsify the signals, for example, in the case of non-spatially resolving sensors. For instance, in acoustic measurements, a welding process that is not optimal leads to a change in the process signal, and, in optical sensors, a different reflectivity of the workpieces leads to different levels of brightness of the reflection signal of the picked-up signals.

According to another advantageous embodiment of the invention, the process signal is an optical signal and the sensor or sensors are correspondingly configured as optical sensors. Such optical sensors are well-established and the signals of optical sensors, for instance, cameras, are easy to evaluate automatically.

When sensors are used that are sensitive to optical wavelengths, it is advantageous to tune these sensors to the laser-specific wavelengths of the laser beams.

In optical systems, it has proven to be particularly advantageous for the sensor or sensors to be coupled to one or more optical systems, for instance, diaphragms, lenses and the like, which allow a precise imaging of the three-dimensional spatial section of the machining onto the sensor or sensors. This generates a clear and unambiguous signal.

Another advantage is achieved when at least one attenuation filter that has been tuned to the wavelength of the laser beam of the laser machining device is provided in front of the sensor or sensors. An optical process signal of a laser machining device—depending on the workpiece—is very bright as a rule and can thus easily exceed the contrast range of an optical sensor. By means of an attenuation filter, the optical signal can be attenuated to such an extent that the contrast range of the sensor is not exceeded. Exceeding the contrast range can lead to over-radiation on adjacent sensor surfaces, so that the picked-up process signal becomes larger and less sharp and thus less precise. Moreover, the active sensor surface can become damaged. Another advantage of such an attenuation filter is that the signal picked up by the sensor is essentially reduced to the process signal. The appertaining workpiece is below the contrast range of the sensor. This facilitates the evaluation of the sensor signal or signals.

CCD or CMOS sensors have proven to be particularly well-suited for the detection. Here, it is very advantageous if only part of the chip is read out. The machining times for generating a welding point in modern laser machining devices lie within the millisecond range, so that the process signal has to be evaluated extremely quickly. Thus, the evaluation time can be shortened if the area to be read out and/or evaluated is reduced to a limited area, which makes it possible to employ simpler system components. The read-out speed then corresponds to the machining speed of the laser machining device.

As an alternative to optical process signals, it can be provided that the process signal is an acoustic signal and that the sensor or sensors are then correspondingly configured as acoustic sensors. Acoustic sensors have also proven to be suitable for detecting a machining area in space.

Reference points that can be detected by the sensor or sensors are advantageously provided for both types of sensor in the three-dimensional spatial section that is to be monitored. This can ensure that the sensors do not accidentally monitor an incorrect area, for example, because they have been misadjusted. This further enhances the process reliability.

If a low-energy laser pointer has been provided that can be positioned so as to be stationary relative to the workpiece, then the adjustment of the sensor or sensors can be simplified. Then, the laser pointer can be oriented towards various points of the detection area of the sensor or sensors without damaging the workpiece or endangering the surroundings. This also makes it possible to calibrate the optical system. A laser pointer is particularly advantageous if attenuation filters are provided that substantially darken the image detected by the sensor or sensors. In this case, it is no longer possible to perform an adjustment by manually orienting the sensors on the basis of the camera image. The light point of the laser pointer, however, generates such a strong reflection that this is visible, even in the attenuated image.

It has been found to be particularly advantageous for a diffractive grid to be provided in front of the laser pointer, and to be used to expand the laser beam of the laser pointer to form a strip structure or grid structure that is projected into the spatial section of the machining process. The strip pattern or grid pattern then becomes visible in the camera image, which allows an especially easy adjustment of the sensor or sensors in terms of orientation as well as in terms of the position of the sensors.

According to another embodiment of the invention, the possibility exists to acquire the process signal directly from the laser beam or indirectly from the machining site of the workpiece.

Furthermore, the possibility also exists to evaluate the signals of the sensor or sensors in a computing unit. This evaluation is carried out taking the spatial detection area or viewing angle of each of the sensors into account, so that a prescribed three-dimensional spatial section can be monitored for process signals of the machining process.

Preferably, according to an advantageous alternative, the data from the one or more trajectories along which the laser beam travels over the workpiece is fed to the computing unit. This translates into a greater informative value regarding the possible occurrence of an error.

Here, the possibility exists for each spatial section to include the one or more trajectories and for the warning device or switch-off device to be activated if the process signal falls below a threshold value.

Alternatively, it can also be provided for this purpose that the spatial section does not include the trajectory, but rather, is in the vicinity of the trajectory and that the warning device or switch-off device is activated if the process signal exceeds a threshold value.

Finally, the possibility exists for the laser machining device to be surrounded by laser-protection walls and for the monitoring device to serve to protect the laser-protection walls by switching off the laser beam by means of the switch-off device.

DESCRIPTION OF THE FIGURE

The FIGURE shows a schematic view of an embodiment of a monitoring device according to the invention in relation to a workpiece.

DESCRIPTION OF A PREFERRED EMBODIMENT

Additional objectives, advantages, application possibilities and configurations of the present invention can be gleaned from the description below of an embodiment making reference to the drawing. Here, all of the described and/or depicted features, either alone or in any meaningful combination, constitute the subject matter of the invention, also irrespective of their compilation in the claims or of their referral back to other claims.

The single FIGURE schematically shows an embodiment of a monitoring device 10 according to the invention for a laser machining device 12, comprising one or more laser beams 13. The laser beam or beams travel in a prescribed, adjustable trajectory along a workpiece 18 for purposes of machining it, whereby this machining operation is repeated from one workpiece 18 to the next during serial production. The machining of the workpiece can be carried out in the form of welding, soldering, cutting, drilling or the like.

The monitoring device 10 has one or more sensors 20, 22 that monitor the process signal 24 of the machining process in a three-dimensional spatial section 26, whereby the sensor or sensors 20, 22 activate a warning device or switch-off device 28 for the laser beam 13 if the process signal or signals 24 in the spatial section 26 exceed or fall below a prescribed threshold value. The process signal 24 can be an optical or acoustic signal, which can depend on the specific machining of the workpiece 18 by means of the laser beam 13. Therefore, the sensor or sensors 20, 22 are correspondingly configured as optical and/or acoustic detectors. If they are optical sensors 20, 22, they are advantageously tuned to the laser-specific wavelengths of the laser beams 13 employed.

The sensors 20, 22 are arranged independently of the laser machining device 12. Consequently, the laser machining device 12 can be moved in space so that the laser beam 13 can travel along the trajectories 14, 16. The sensors 20, 22 detect the spatial section 26 in question. Moreover, the sensors 20, 22 can be positioned so as to be stationary during the machining process, so that a prescribed spatial section is always monitored rather than a spatial section prescribed by the direction of the laser beam 13.

The sensors 20, 22 are spatially resolving sensors that two-dimensionally detect the spatial section 26 and the machining site 30. Towards this end, the sensors 20, 22 are provided with optical systems that project the image onto the sensor surface of the sensors 20, 22 that is active in a given case. Generally suitable devices for this purpose are known in the state of the art. The sensors 20, 22 are configured as CCD sensors. It is likewise possible to use CMOS sensors instead of CCD sensors. For evaluation purposes, only part of the image acquired by the sensors 20, 22 is read out and evaluated in order to increase the machining speed.

The process signal 24 can be derived or acquired directly from the laser beam 13. As an alternative to this, it is also possible to obtain the process signal 24 indirectly from the machining site 30 of the workpiece 18.

Preferably, two or even more sensors 20, 22 are employed whose signals are evaluated in a computing unit 32. The data 34 of the one or more trajectories 14, 16 can be additionally fed to the computing unit 32.

The monitoring by means of the monitoring device 10 can be carried out, on the one hand, in such a way that, in any case, the spatial section 26 also necessarily includes the one or more trajectories 14, 16, and then the warning device or switch-off device 28 is activated if the process signal 24 falls below a threshold value or into a certain defined threshold value range.

As an alternative to this measure, it is also possible for the spatial section 26 not to include the trajectories 14, 16, but rather, to be in the vicinity of the trajectories 14, 16, whereby then the warning device or switch-off device 28 is activated if the process signal 24 exceeds a threshold value or falls into a certain defined threshold value range.

Therefore, on the one hand, the possibility exists to monitor the three-dimensional spatial section in which the laser beam or the process signal should be present in case no error has occurred, whereby a drop in the activities is used to recognize if an error has occurred. On the other hand, the three-dimensional spatial section that is adjacent to the trajectories can also be monitored in which process activities normally cannot be recognized at all, or only to a small extent, in the error-free state. Then, a rise in the process signals in this area is used to recognize a possible fault scenario.

The monitoring device 10 can advantageously also be employed when the laser machining device 12 is surrounded by laser protection walls and the monitoring device 10 is used to protect the laser walls by switching off the laser beam by means of the switch-off device 28.

In order to facilitate the adjustment of the sensors 20, 22, reference points 38', 38'', 38''' are provided in the machining space and these points are detected by the sensors 20, 22. The reference points 38'', 38''' also serve to ensure the correct orientation of the sensors 20, 22 in that the evaluation device 32 evaluates whether the reference points 38', 38'', 38''' are located in a certain image area of the sensors 20, 22.

Furthermore, a laser pointer 40 is provided that generates a light point or the like in the machining area 26 that is detected by the sensors 20, 22 before the start of the machining operation. A strip pattern or grid pattern can also be generated by means of a diffractive grid.

While preferred embodiments of the invention have been described and illustrated here, various changes, substitutions and modifications to the described embodiments will become apparent to those of ordinary skill in the art without thereby departing from the scope and spirit of the invention.

LIST OF REFERENCE NUMERALS 10 monitoring device
12 laser machining device
13 laser beam
14 trajectory
16 trajectory
18 workpiece
20 sensor
22 sensor
24 process signal
26 spatial section
28 switch-off device
30 machining site
32 computing unit
34 data
38', 38", 38'" reference source
40 laser pointer

The invention claimed is:

1. A monitoring device (10) for a laser machining device (12) for machining a workpiece (18), comprising:
one or more sensor or sensors (20, 22) that monitor one or more process signals (24) of the laser machining device (12) in a three-dimensional spatial section (26) associated with the workpiece (18), whereby the sensor or sensors (20, 22) transmit signal data to a computing unit (28) so that a warning device or switch off device (28) for one or more laser beams coupled to the computing unit may be activated if the process signal or signals (24) in the spatial section (26) exceed or fall below a prescribed threshold value, wherein the sensor or sensors (20, 22) are independent of the laser machining device (12);
a low-energy laser pointer (40); and
a diffractive grid with which the laser beam of the laser pointer (40) is expanded to form a strip structure or grid structure that is projected into the spatial section (26).

2. The monitoring device according to claim 1, characterized in that the sensor or sensors (20, 22) are positioned so as to be stationary relative to the workpiece (18).

3. The monitoring device according to claim 1, characterized in that the sensor or sensors (20, 22) are configured so as to be moveable relative to the workpiece (18).

4. The monitoring device according to claim 3, characterized in that the sensor or sensors (20, 22) are positioned so as to be stationary relative to the workpiece (18) as said workpiece (18) is machined by the laser machining device (12).

5. The monitoring device according to claim 1, characterized in that the sensor or sensors (20, 22) are selected from the group consisting of: optical sensors and acoustic sensors.

6. The monitoring device according to claim 1, characterized in that the process signal (24) is an optical signal and the sensor or sensors (20, 22) are correspondingly configured as optical sensors.

7. The monitoring device according to claim 6, characterized in that the sensor or sensors (20, 22) are tuned to the laser-specific wavelength of the laser beams (13).

8. The monitoring device according to claim 6, characterized in that one or more diaphragms are coupled to the sensor or sensors (20, 22).

9. The monitoring device according to claim 6, characterized in that at least one attenuation filter that has been tuned to the wavelength of the laser beam (13) of the laser machining device (12) is provided in front of the sensor or sensors (20, 22).

10. The monitoring device according to claim 6, characterized in that the sensor or sensors (20, 22) are configured as CCD or CMOS sensors that acquire an image and only part of the image acquired by each of the sensors (20, 22) is read out or evaluated.

11. The monitoring device according to claim 1, characterized in that the process signal (24) is an acoustic signal and that the sensor or sensors (20, 22) are then correspondingly configured as acoustic sensors.

12. The monitoring device according to claim 1, characterized in that reference points (38', 38", 38'") that can be detected by the sensor or sensors (20, 22) are provided in the spatial section (26).

13. The monitoring device according to claim 1, wherein the low-energy laser pointer (40) can be positioned so as to be stationary relative to the workpiece (18).

14. The monitoring device according to claim 1, characterized in that the process signal (24) is acquired directly from the laser beam (13) or indirectly from a machining site (30) of the workpiece (18).

15. The monitoring device according to claim 1, characterized in that data (34) for one or more trajectories (14, 16) for travel of the one or more laser beams (13) is preprogrammed in the computing unit (32).

16. The monitoring device according to claim 1, characterized in that the laser machining device (12) is surrounded by laser-protection walls and the monitoring device (10) switches off the laser beam (13) by means of a switch-off device (28) to protect the laser protection walls.

17. The monitoring device according to claim 6, characterized in that one or more optical systems are coupled to the sensor or sensors (20, 22).

18. A monitoring system for a laser machining device, comprising:
one or more sensors independently operable from the laser machining device, wherein said sensor(s) monitor one or more process signals in a three-dimensional spatial section associated with a workpiece processed by one or more laser beams emitted by the laser machining device;
one or more attenuation filters to darken images detected by the one or more sensors;
a warning device or switch-off device for the one or more laser beams, said warning device or switch-off device being activated if a process signal or process signals in the spatial section either exceed or fall below a prescribed threshold value; and
a laser pointer generating a light point or having a diffractive grid with which the laser beam of the laser pointer is expanded to form a strip structure or grid structure, wherein said light point, strip structure or grid structure is projected into the spatial section for detection by the sensor(s) to calibrate the sensor(s) before the laser machining device begins machining the workpiece.

* * * * *